United States Patent [19]

Izumi

[11] Patent Number: 4,812,701
[45] Date of Patent: Mar. 14, 1989

[54] COVER APPARATUS FOR WEIGHING MACHINES

[75] Inventor: Asashiro Izumi, Kurita, Japan

[73] Assignee: Kabushiki Kaisha Ishida Koki Seisakusho, Kyoto, Japan

[21] Appl. No.: 31,194

[22] Filed: Mar. 27, 1987

Related U.S. Application Data

[60] Continuation of Ser. No. 757,557, Jul. 22, 1985, abandoned, which is a division of Ser. No. 417,117, filed as PCT JP81/00395 on Dec. 17, 1981, published as WO82/02430 on Jul. 22, 1982, Pat. No. 4,545,630.

[30] Foreign Application Priority Data

Jan. 9, 1981 [JP] Japan .................................. 56-2064
Jul. 11, 1981 [JP] Japan .............................. 56-103020

[51] Int. Cl.⁴ ............................................. A47B 81/00
[52] U.S. Cl. ...................................... 312/285; 160/206; 177/25.18; 312/138 R; 312/283
[58] Field of Search ............... 312/285, 138 R, 116, 312/283, 287, 289, 286; 160/206; 49/40, 41; 177/25.18; 211/162, 180

[56] References Cited

U.S. PATENT DOCUMENTS

| | | | |
|---|---|---|---|
| 735,614 | 8/1903 | Stevens | 312/285 X |
| 910,351 | 1/1909 | Bendz | 312/285 X |
| 1,242,235 | 10/1917 | Polk | 312/285 X |
| 1,713,661 | 5/1929 | Kemball et al. | 312/285 X |
| 3,164,429 | 1/1965 | Kohl | 312/285 X |
| 3,623,785 | 11/1971 | Williams | 312/138 R X |
| 3,939,928 | 2/1976 | Murakami et al. | 177/25.18 |
| 4,101,609 | 7/1978 | Sumrow | 312/292 X |
| 4,224,975 | 9/1980 | Uehara | 160/206 |
| 4,276,919 | 7/1981 | Walters | 160/206 |
| 4,295,514 | 10/1981 | Johnson | 160/206 |
| 4,313,507 | 2/1982 | Hays | 177/25.18 X |
| 4,344,492 | 8/1982 | Hirano | 177/25.18 |
| 4,398,612 | 8/1983 | Mikami et al. | 177/25.18 |

FOREIGN PATENT DOCUMENTS

839081 5/1952 Fed. Rep. of Germany ...... 312/285
2525886 11/1983 France ................................ 312/116

Primary Examiner—Peter A. Aschenbrenner
Assistant Examiner—Thomas A. Rendos
Attorney, Agent, or Firm—Armstrong, Nikaido, Marmelstein & Kubovcik

[57] ABSTRACT

A cover apparatus comprising a plurality of peripherally divided and interconnecting cover sections positioned around and outside a plurality of weighing machines, that are arranged in turn in a predetermined array or pattern, the cover sections encircling conjointly the weighing machines in their entirety. The apparatus is so designed that a large space for opening or closing the cover sections is not required and a sufficient open area may be afforded when opened so as to permit the inspection of the weighing machines and other components.

2 Claims, 5 Drawing Sheets

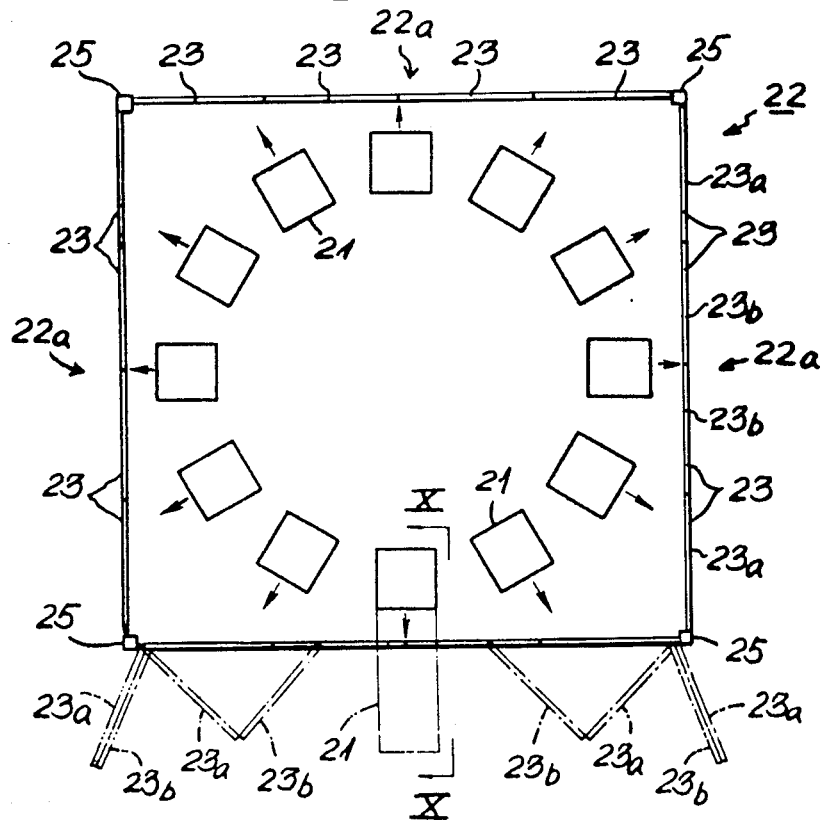
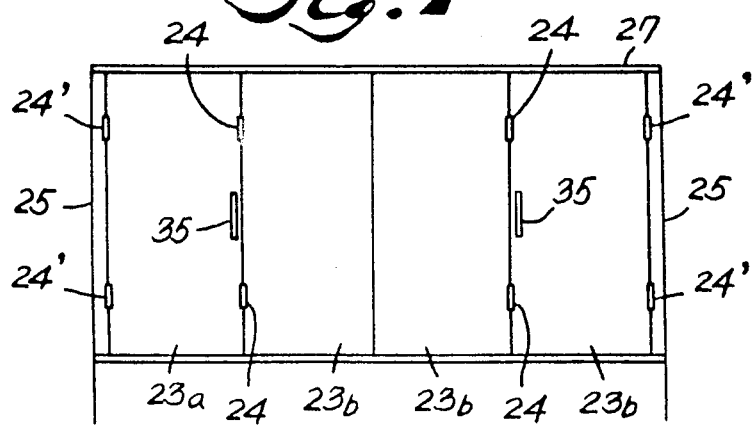

COVER APPARATUS FOR WEIGHING MACHINES

This application is a continuation of application Ser. No. 757,557, filed July 22, 1985, now abandoned, which is a division of application Ser. No. 417,117 filed as PCT JP81/00395 on Dec. 17, 1981, published as WO82/02430 on Jul. 22, 1982, U.S. Pat. No. 4,545,630.

DESCRIPTION

This invention relates to a cover apparatus designed for encircling and protecting a plurality of weighing machines.

The cover apparatus is designed for protecting a plurality of weighing machines arranged in a circular or similar predetermined pattern, and acts as sound- and dust-proofing means for the weighing machines. The conventional cover apparatus for weighing machines is composed of panels arranged as a slide or door or designed as a circular cover. The slide-type apparatus is defective in that stopper means cannot be provided because of the complicated inside structure of the cover. The door-type apparatus tends to be bulky because of the space required for door rotation. Moreover, with the slide-type apparatus, the slide is simply shifted to one side and the apparatus cannot be opened on all sides simultaneously. With the door-type apparatus, a complex structure is required to open the doors fully on all sides. In the case of the circular slide-type apparatus, it is not necessary to provide such additional space or stopper means, but the structure is not of the type to permit opening of all sides simultaneously.

Certain weighing machines arranged in a circle may be tilted outwardly, that is, in the direction of the surrounding cover, to facilitate cleaning or inspection of the inside structure. Hence, with the cover apparatus that cannot be opened on all sides, the weighing machines cannot be tilted simultaneously, but only those machines which have been exposed by the opening of the associated side panels can be tilted at a time, which means a complicated operation and a lower operational efficiency.

The present invention contemplates providing a cover apparatus devoid of these inconveniences.

According to one aspect of the present invention, plural weighing machines are encircled by a cover and inner and outer rails are provided around the weighing machines arranged in a circle. Plural arcuate inner covers and plural arcuate outer covers are movably mounted on the inner and outer rails, respectively. Thus the inner and outer covers provide a continuous circular enclosure having stepped connecting portions at the side edges of the covers. The weighing machines may be enclosed easily in a sound- and dust-proof manner. Since the inner and outer covers may be movable in the manner of a sliding door along the inner and outer rails, respectively, the inner and outer covers can be overlapped for desired length. An open surface of any desired opening angle up to a maximum angle of 180° can be realized at any desired position along the circumference subject to circular displacement of the inner and outer covers. Hence, the inside structure of the cover can be exposed to the outside as desired to permit the weighing machines to be tilted outwardly to allow prompt cleaning or inspection of the inside structure. Stopper means as required in the conventional covers or doors may be dispensed with, while the space so far required for rotary doors may be minimized because the inner and outer covers need perform only a circular motion. In addition, the manufacture or mounting of the cover apparatus may be simplified and the apparatus may be handled conveniently.

According to another aspect of the present invention, the weighing machines are tiltable outwards and arranged in a circle. The weighing machines are surrounded by a multi-sided enclosure with a plurality of cover sections making up each side of the enclosure. The enclosure thus is formed by plural pairs of panels that are connected to each other by hinges. Thus each cover section constituting the cover surface may be closed tightly by the operation of hinged panels with complete sound- and dust-proofing effects. By virtue of the hinged panel structure, each cover section can be opened completely, so that the weighing machines can be tilted to permit the cleaning or inspection to be carried out easily and promptly. Stopper means as required in the conventional covers or doors may be dispensed with, while the space required for rotary doors may be minimized. The structure may be made simpler than that of the slide door type circular cover apparatus.

These and other objects and features of the invention will become more apparent from the following description when read in conjunction with the accompanying drawings, in which FIG. 1 is a sectional side elevation showing an embodiment of the cover apparatus of the present invention.

FIG. 7 is a front view showing a modified embodiment of the cover apparatus of the present invention;

FIG. 8 is a plan view of the cover apparatus shown in FIG. 7.

Figure 1:
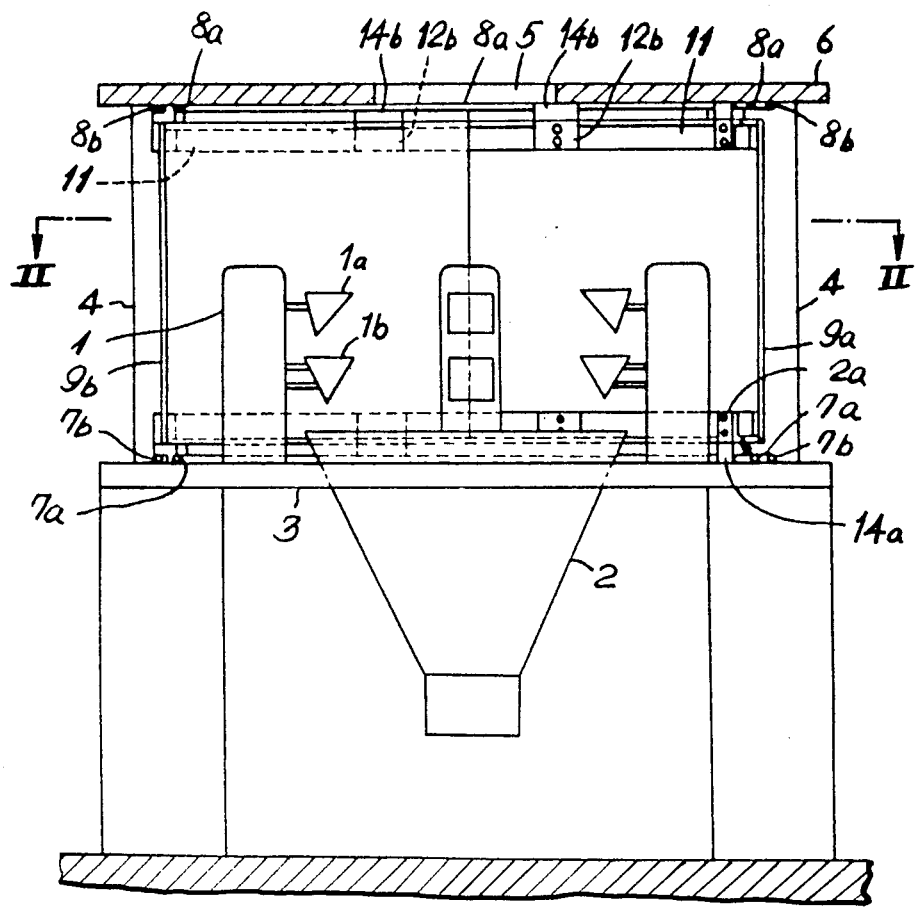
Figure 2:
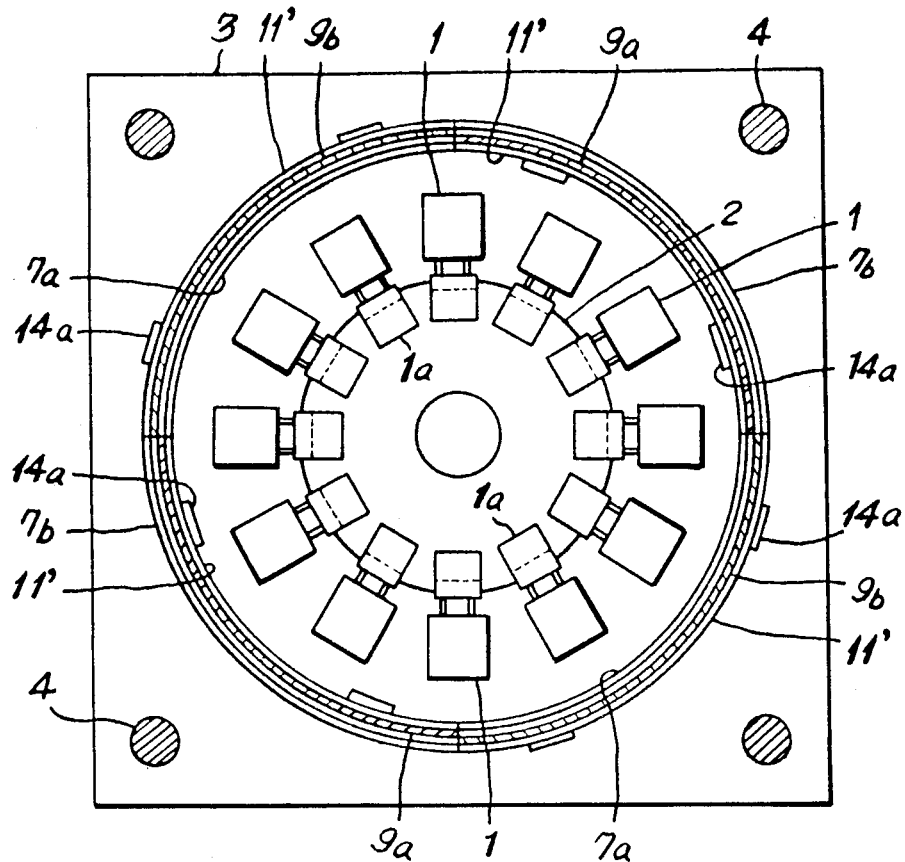
FIG. 2 is a sectional view taken along line II—II of FIG. 1.

In FIGS. 1 and 2, numeral 1 denotes a plurality of weighing machines mounted on a support base 3 and arranged in a circle around the upper opening of a chute 2, which is arranged in turn as a hopper and fitted to the support base 3 for collecting and conveying weighed articles. The numeral 1a denotes pool hoppers for the weighing machines and the numeral 1b denotes weighing hoppers. Four support posts 4 are mounted upright on the four corners of the support base 3 for supporting an upper plate 6 directly above the support base 3. The upper plate 6 is approximately the same size and shape as the support base and has a central through-hole (5) for introducing the articles to be weighed.

Figure 3:
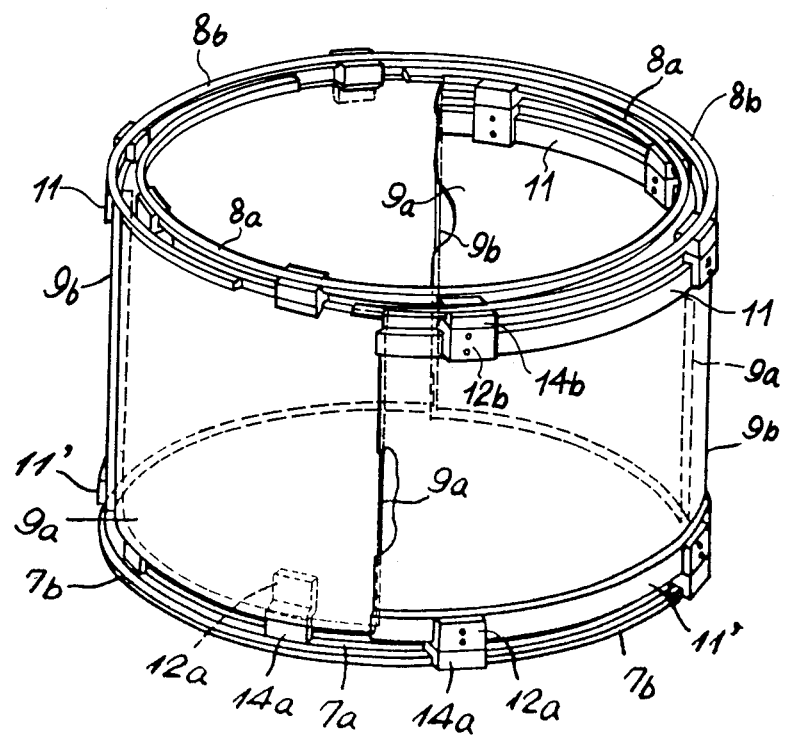
FIG. 3 is a perspective view of the cover apparatus shown in FIG. 1.
Figure 4:
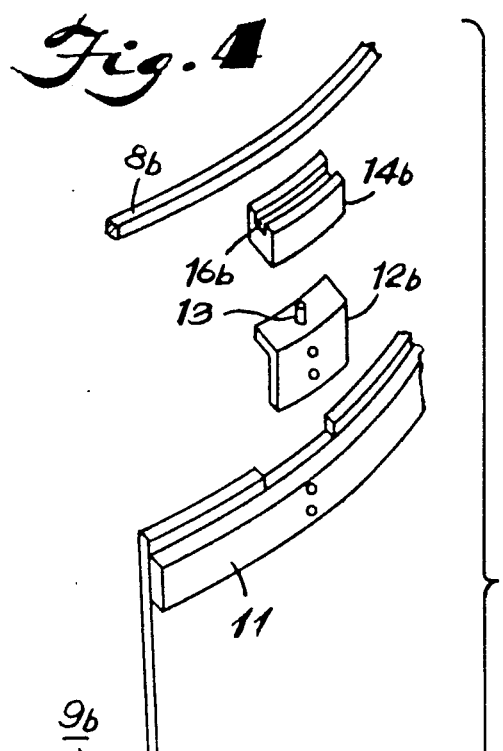
FIG. 4 is a partially exploded perspective view of an outer cover.

As shown in FIGS. 1 to 3, a dual rail consisting of a lower inner rail 7a and a lower outer rail 7b is laid on the support base 3 outside of and concentrically with respect to the circular mounting line of the weighing machines 1. Another dual rail consisting of an upper inner rail 8a and an upper outer rail 8b is laid as shown on the lower surface of the upper plate 6 and directly above the first dual rail so that the rails 8a, 8b register with the rails 7a, 7b, respectively. An inner cover 9a and an outer cover 9b are mounted as shown on these lower inner and outer rails 7a, 7b and the upper inner and outer rails 8a, 8b. FIG. 4 shows the outer cover 9b having an arcuate cover 10 made of transparent or translucent synthetic material and reinforcement plates 11, 11' occasionally mounted on the upper and lower ends of the cover 10. The inner cover 9a is constructed in a manner similar to the outer cover 9b, but has the reinforcement plates 11, 11' attached to the inner sides of the cover 10. Metallic fixtures 12a, 12b are mounted as shown on the lower edges and the upper edges of the inner and outer covers 9a, 9b, and are provided with bosses 13 that may be fitted loosely into corresponding openings 15 of rolls (or slider) 14a, 14b, these rolls 14a, 14b both being mounted rollably. These rolls 14a, 14b are provided as shown with recessed grooves 16a, 16b engaged with associated inner and outer rails 7a, 7b, 8a, 8b, respectively.

The circumferential extent of each of the inner and outer covers is selected to be equal to that of an arc of a circle obtained by dividing the circumference of the inner and outer rails into whole number equal parts. Each of the inner and outer covers shown in FIGS. 1 and 3 extends over the circumference of one quarter circle obtained upon quadrisection of the circumference of the rails 7a, 7b, 8a, 8b. In this example, two inner covers 9a and two outer covers 9b are mounted on the upper and lower inner rails 8a, 7a and on the upper and lower rails 8b, 7b, respectively. In this example, two lower and upper rolls 14a, 14b as shown or more than two lower and upper rolls are provided on each one of the inner and outer covers 9a, 9b and mounted by the medium of metal fixtures 12a. These rolls 14a, 14b are fitted by the respective grooves 16a, 16b to the lower and upper inner rails 7a, 8a and to the lower and upper outer rails 7b, 8b for mounting the two inner covers (9a) (9a) in the inner rails 7a, 8a and the two outer covers 9b, 9b in the outer rails 7b, 8b. The inner covers 9a, 9a and the outer covers 9b, 9b are movable freely with circular movement on the respective rails. The lower and upper rolls 14a, 14b are arcuately contoured with a radius of curvature equal to that of the rails 7a, 7b, 8a, 8b and preferably formed of resilient synthetic material so that the rolls may readily conform to the circular contour of the rails to assure smooth operation of the device even when the rolls are not truly circular by reason of manufacture tolerances.

Figure 5:
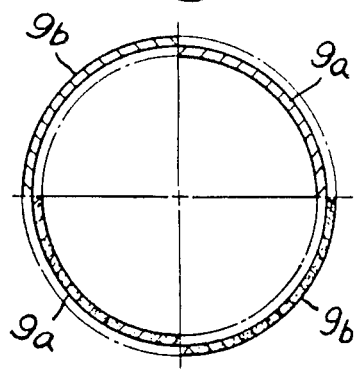
FIGS. 5 and 6 are diagrammatic views showing the operation of the cover apparatus.
Figure 6:
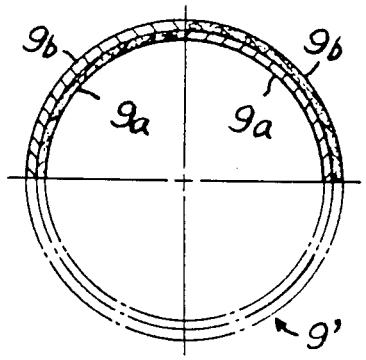

The inner covers 9a and the outer covers 9b are thus movable circularly on the lower and upper inner rails 7a, 8a and on the lower and upper outer rails 7b, 8b in the fashion of sliding doors. Since each of the two inner covers 9a, 9a and the two outer covers 9b, 9b has a circumferential extent corresponding to quadrisection of the circumference of the inner and outer rails 7a, 7b, when the inner covers 9a, 9a and the outer covers 9b, 9b are arranged alternately in a circle, the four covers 9a, 9b are placed in conjunction to one another with stepped connecting portions at the respective end edges of the covers as shown in FIGS. 2 and 5 for providing a circular cover as a whole surrounding the weighing machines 1. The circular cover may be opened at one side over 180 degrees by sliding the inner covers 9a, 9a and the outer covers 9b, 9b appropriately so that the inner covers 9a, 9a may be overlapped completely with the outer covers 9b, 9b, as shown in FIG. 6. The opened portion 9' may be shifted to any desired position on the rail circumference without changing its circumferential extent of 180° by moving the overlapped inner and outer covers in their entirety. The weighing machines and other components within the cover may be repaired or cleaned while the surrounding cover is opened in the manner described above. With the cover thus opened, the weighing machines disposed in the opened portion are exposed to the outside and may thus be repaired or cleaned easily. Since the opened portion can be shifted easily along the rails, cleaning can be performed for all of the portions surrounded by the cover. The opening angle of 180° is the maximum angle attainable with two inner and two outer covers, and the angle can be set to any desired value smaller than 180° by changing the overlapping degree of the inner and outer covers. It should however be noted that this opening angle of 180 degrees is optimum for increasing the efficiency of a repair or cleaning operation.

The two inner covers and the two outer covers may be replaced by a single semicircular inner cover and a single semicircular outer cover each mounted on one rail for realizing the same function as mentioned above. The rails may be divided circumferentially into three or more equal portions and three or more inner and outer covers may be used and have circumferential extents equal to those of the above rail portions. However, the foregoing example with the two inner and two outer covers is most useful in view of manufacture, mounting or handling of the inner and outer covers. As mentioned above, the maximum opening angle of the surrounding cover equal to 180 degrees is optimum for cleaning. However, such opening angle may be less than 180 degree and may for example be 120 degrees. In such case it is preferred that the circumferential extent of the inner and outer covers correspond to trisection of the inner and outer rails, and that one inner cover be used in conjunction with two outer covers.

Referring to a modification shown in FIGS. 7 and 8, a cover apparatus 22 of a rectangular contour is mounted as shown on the outside of and surrounding a plurality of circularly arranged weighing machines 21. The cover apparatus 22 shown has the contour of a square and has its cover section 22a formed by four panels 23 assembled in the manner of hinged doors. As shown in FIGS. 7 and 8, two sets of panels 23a, 23b; 23a, 23b are connected together by hinges 24, 24. The first panels 23a, 23a of the respective sets are connected to vertical girders 25, 25 by hinges 24', 24', while the second panels 23b, 23b are abuttable on the longitudinal edges thereof so that the panel section 22a may be developed between the girders 25, 25 for closing the one surface of the cover apparatus as shown in FIG. 7 and by the solid line in FIG. 8. Because the construction of the cover or panel section 22a is in the manner of hinged doors, the panels 22a, 23b; 23a, 23b are folded at the hinges 24, 24 as shown by the chain-dotted line in FIG. 8. Ultimately the panels are folded at the hinges 24', 24' so that the first panels 23a, 23a and the second panels 23b, 23b associated therewith are brought into overlapping relation to one another.

Figure 9:
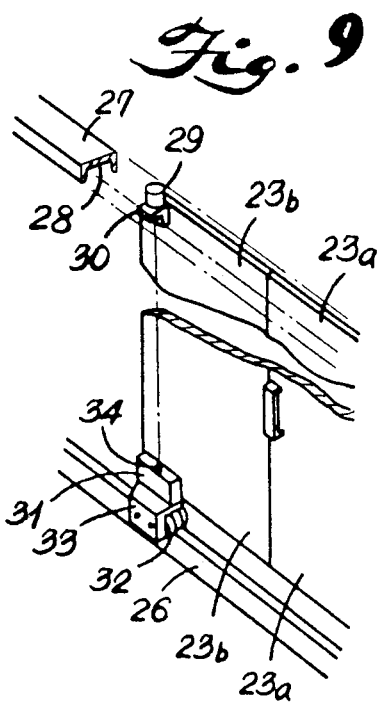
FIG. 9 is a partial perspective view of the cover apparatus shown in FIG. 7 and showing the manner of opening or closing the panels.

For guiding the panels of each cover section 22a in this manner, a lower guide rail 26 and an upper channel-shaped guide rail 27 are provided for extending between the girders 25, 25, as shown in FIGS. 7 and 9. Holding members 30 each having a roll 29 of a size to freely fit into the channel 28 of the guide rail 27 are provided on the upper ends of the mutually abutting side edges of the second panels 23b, 23b of each set of panels. An engaging member 31 is provided on the lower end of each of the mutually abutting side edges and is loosely fitted into a projection 34 disposed on a mounting member 33 of a small wheel 32 rolling on the lower guide rail 26. The projection 34 is positioned so as to lie directly below the roll 29. In this manner, the roll 29 and the engaging member 31 are pivotably disposed on the same vertical axis and the roll 29 and wheel 32 are movable conjointly along the upper and lower rails 27, 26. By the operation of the rolls and the engaging members, the first panels 23a and the second panels 23b of the two sets of panels may be opened smoothly from the closed state in the manner of hinged doors, with the panels 23a, 23b being folded in overlapped manner at the girders 25 for opening the surface of the cover section 22a completely. When the panels are to be closed from the opened state, the mutually abutting side edges of the second panels 23b, 23b may be pulled towards the center of the open surface by the reverse procedure to that mentioned above. The upper rolls 29 and the lower engaging members 31 of the second panels 23b, 23b are then moved along the upper and lower guide rails 27, 26, and the first and second panels 23a, 23b are extended and ultimately flattened out into the closed state. The first panel 23a or the second panel 23b may be fitted with a handle 35 to facilitate such opening or closing of the cover section 22a.

Figure 10:
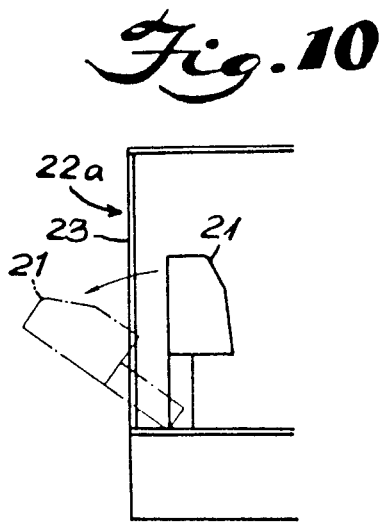
FIG. 10 is a schematic sectional view taken along line X—X of FIG. 8 and showing the tilting of the weighing machine.

Cover sections similar to the cover section 22a mentioned above are provided on each surface of the square cover apparatus for enclosing a plurality of circularly arranged weighing machines. The cover sections on all of the four surfaces may be opened in the manner of hinged doors and there are no obstructions such as sliding doors so that tilting of the weighing machines (see FIG. 10) during inspection of the weighing machines and cleaning of the components inside the cover can be performed smoothly on the respective cover sections.

In the above example, the cover apparatus has a square contour, but it may be arranged in the form of a regular hexagon or in any other polygonal or circular contour. The respective panels of the cover sections may be made of transparent or translucent plastic so that the inside of the cover may be checked from the outside for convenience in management of the overall operation.

The weighing machines need not be arranged in a circle, but may be arranged in a square or any other pattern.

It is evident that broadly different embodiments can be conceived without departing from the spirit and scope of the invention and hence the invention is not limited to any of the specific embodiments mentioned herein except as defined in the appended claims.

I claim:

1. A plurality of weighing machines in combination with a cover apparatus, comprising:

a plurality of weighing machines arranged in turn in a predetermined array or pattern; and a cover apparatus, including a plurality of peripherally divided and interconnecting cover sections positioned around and outside of said plurality of weighing machines, such that said cover sections conjointly encircle said weighing machines in their entirety, and a support base for supporting each of said weighing machines and said cover sections in their position encircling said plurality of weighing machines, said support base having an opening therein, between said weighing machines, through which a chute for receiving and channeling contents discharged from said plurality of weighing machines, extends, such that said chute is substantially disposed outside of said cover apparatus, and wherein each of said cover sections includes, a plurality of foldably connected panels, with neighboring panels of said cover sections being connected together in the manner of hinged doors, such that the cover apparatus has the contour of a polygon, each side of which is formed by at least a pair of said cover sections.

2. The combination of claim 6, wherein said cover apparatus further comprises:

an upper guide rail in the shape of an inverted channel;

a lower guide rail positioned below said upper guide rail such that said cover sections are held therebetween;

a holding member disposed on a top, outside edge of one of said cover panels away from a connecting hinge connecting adjacent panels to one another;

a roll attached to said holding member such that said roll is freely moveable along the channel of said upper guide rail;

an engaging member disposed on a bottom, outside edge of one of said cover panels away from said connecting hinge to correspond with said holding member; and a mounting member pivotally attached to said engaging member, said mounting member having a wheel means engageable with said lower guide rail for movement therealong.

* * * * *